US011579374B2

(12) United States Patent
Lee et al.

(10) Patent No.: US 11,579,374 B2
(45) Date of Patent: Feb. 14, 2023

(54) HYBRID INGRESS PROTECTED CONNECTOR AND ADAPTER ASSEMBLY

(71) Applicant: Senko Advanced Components, Inc., Marlborough, MA (US)

(72) Inventors: Benjamin Lee, Wayland, MA (US); Paul Newbury, Ashland, MA (US); Kazuyoshi Takano, Tokyo (JP); Jeffrey Gniadek, Oxford, ME (US)

(73) Assignee: Senko Advanced Components, Inc., Hudson, MA (US)

( * ) Notice: Subject to any disclaimer, the term of this patent is extended or adjusted under 35 U.S.C. 154(b) by 61 days.

(21) Appl. No.: 17/067,092

(22) Filed: Oct. 9, 2020

(65) Prior Publication Data

US 2021/0033800 A1 Feb. 4, 2021

Related U.S. Application Data

(63) Continuation of application No. 16/292,921, filed on Mar. 5, 2019, now Pat. No. 10,802,223.

(60) Provisional application No. 62/651,679, filed on Apr. 2, 2018.

(51) Int. Cl.
 *G02B 6/38* (2006.01)
 *H01R 13/426* (2006.01)

(52) U.S. Cl.
 CPC ......... *G02B 6/3831* (2013.01); *G02B 6/3849* (2013.01); *H01R 13/426* (2013.01); *G02B 6/3891* (2013.01)

(58) Field of Classification Search
 CPC ................ G02B 6/3831; G02B 6/3849; H01R 13/426
 See application file for complete search history.

(56) References Cited

U.S. PATENT DOCUMENTS

| 6,116,790 | A  | 9/2000  | Vergeest |
| 6,409,393 | B1 | 6/2002  | Grois et al. |
| 6,542,674 | B1 | 4/2003  | Gimblet |
| 6,546,175 | B1 | 4/2003  | Wagman |
| 6,585,423 | B1 | 7/2003  | Vergeest |
| 6,648,520 | B2 | 11/2003 | McDonald |
| 6,714,710 | B2 | 3/2004  | Gimblet |
| 6,785,450 | B2 | 8/2004  | Wagman |
| 6,899,467 | B2 | 5/2005  | McDonald |
| 6,908,233 | B2 | 6/2005  | Nakajima et al. |
| 7,001,079 | B2 | 2/2006  | Vergeest |
| 7,090,406 | B2 | 8/2006  | Melton |
| 7,090,407 | B2 | 8/2006  | Melton |
| 7,111,990 | B2 | 9/2006  | Melton |
| 7,113,679 | B2 | 9/2006  | Melton |
| 7,118,283 | B2 | 10/2006 | Nakajima et al. |

(Continued)

FOREIGN PATENT DOCUMENTS

| WO | WO2010039830 A2 | 4/2010 |
| WO | WO2010039830 A3 | 6/2010 |

(Continued)

*Primary Examiner* — Sung H Pak

(57) ABSTRACT

A hybrid ingress protection adapter and connector assembly, connecting the housing with a releasably replaceable connector and power assembly to an adapter that is mount on a panel. The connector has a pair of lead-ins that protect a ferrule of a plural of fiber optic connectors, and the lead-ins are of varying length allow blind mating of the connector assembly with the adapter assembly.

21 Claims, 22 Drawing Sheets

(56) References Cited

U.S. PATENT DOCUMENTS

| | | |
|---|---|---|
| 7,234,875 B2 | 6/2007 | Krowiak |
| 7,241,056 B1 | 7/2007 | Kuffel |
| 7,264,402 B2 | 9/2007 | Theuerkorn |
| 7,281,856 B2 | 10/2007 | Grzegorzewska |
| 7,344,317 B2 | 3/2008 | Krowiak |
| 7,429,136 B2 | 9/2008 | Lewallen |
| 7,467,896 B2 | 12/2008 | Melton |
| 7,476,035 B2 | 1/2009 | Cull et al. |
| 7,539,380 B1 | 5/2009 | Abernathy et al. |
| 7,559,700 B2 | 7/2009 | Eguchi et al. |
| 7,567,741 B2 | 7/2009 | Abernathy et al. |
| 7,572,065 B2 | 8/2009 | Lu |
| 7,654,747 B2 | 2/2010 | Theuerkorn |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,796,853 B2 | 9/2010 | Abernathy et al. |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,814,441 B2 | 8/2014 | Strasser et al. |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 | 8/2017 | Van Baelen |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 10,613,278 B2 | 4/2020 | Kempeneers et al. |
| 2006/0045428 A1 | 3/2006 | Theuerkorn |
| 2007/0058907 A1* | 3/2007 | Mynott ............... G02B 6/3817 385/60 |
| 2008/0273855 A1 | 11/2008 | Bradley |
| 2009/0257717 A1 | 10/2009 | Liu |
| 2010/0329267 A1 | 12/2010 | Sakamoto |
| 2011/0222826 A1 | 9/2011 | Blackburn |
| 2013/0136398 A1 | 5/2013 | Isenhour |
| 2017/0227719 A1 | 8/2017 | Zimmel |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |
| 2020/0241218 A1 | 7/2020 | Kempeneers et al. |

FOREIGN PATENT DOCUMENTS

| | | |
|---|---|---|
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

* cited by examiner

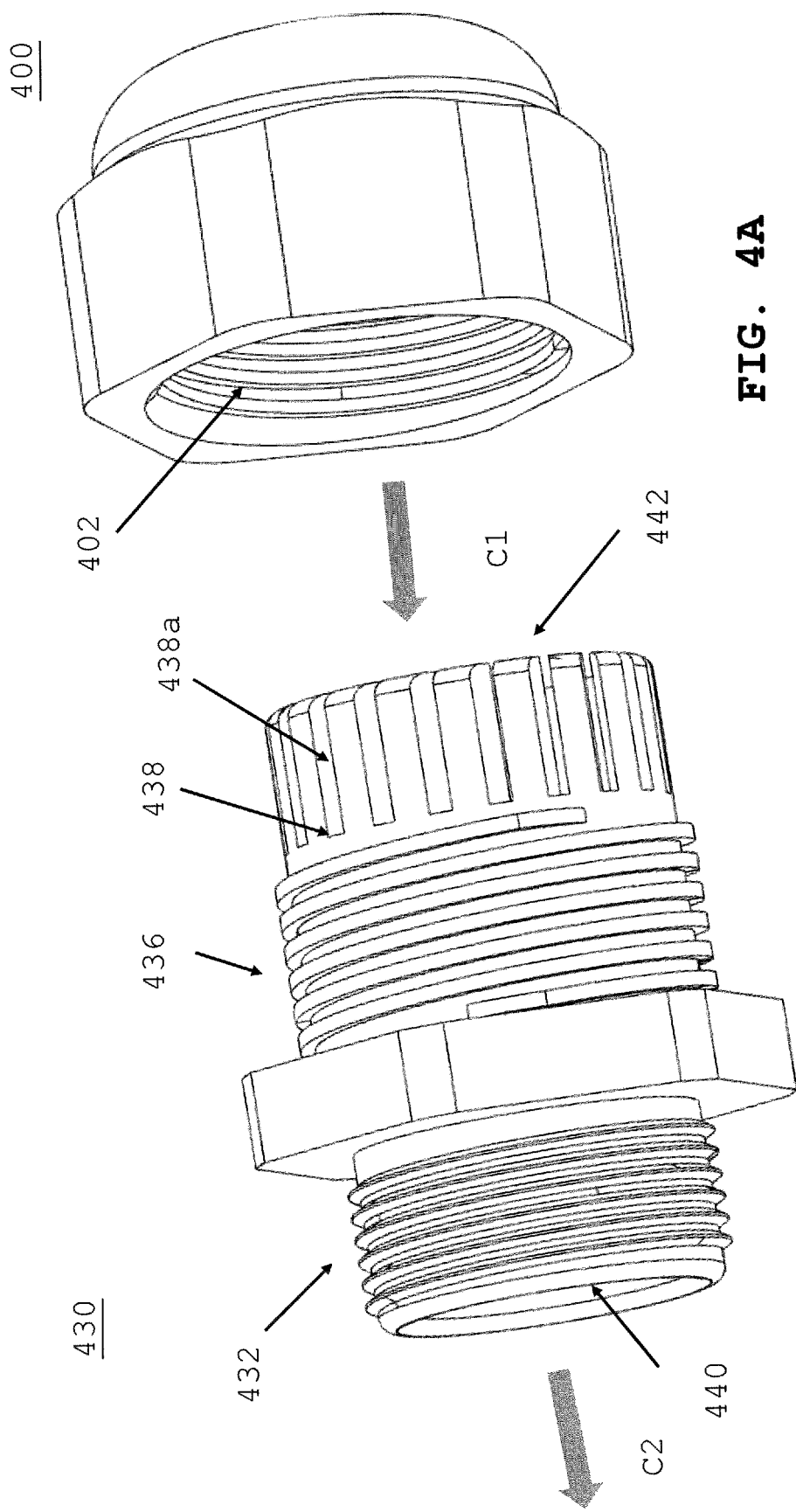

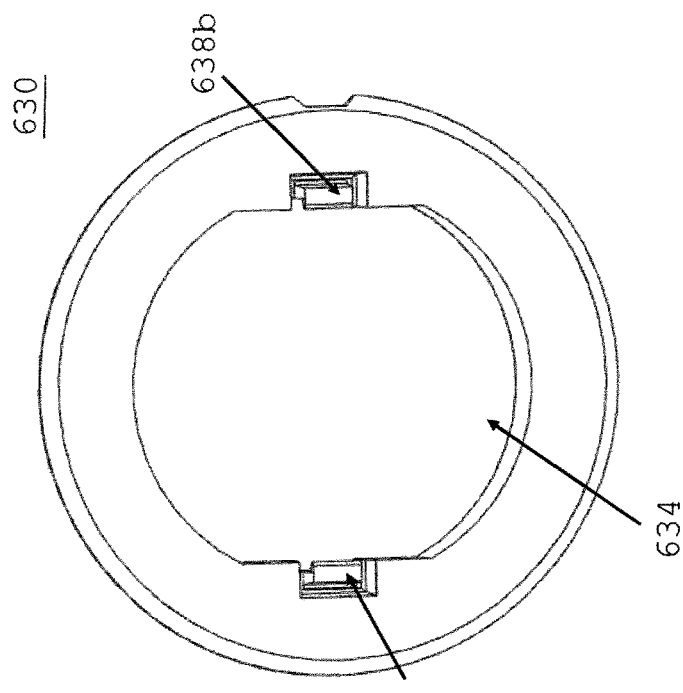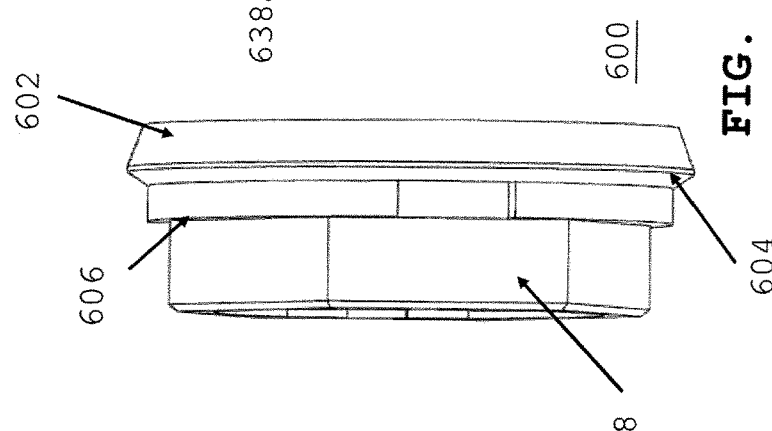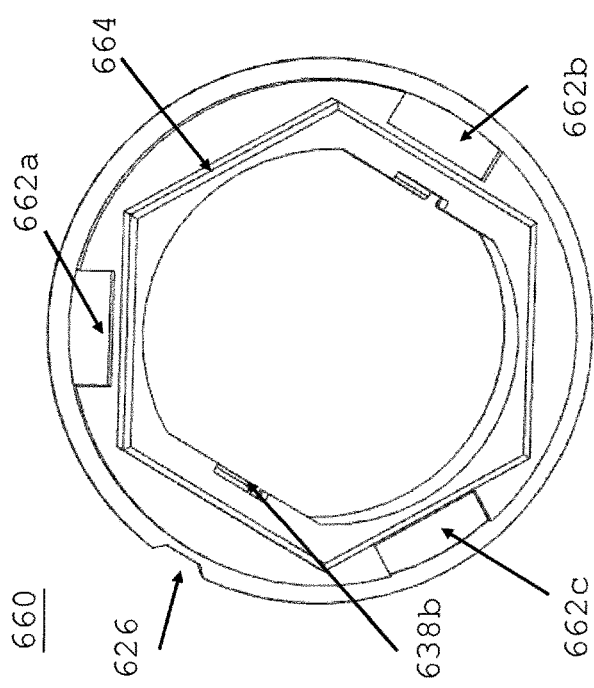

HYBRID INGRESS PROTECTED CONNECTOR AND ADAPTER ASSEMBLY

CROSS REFERENCE TO RELATED APPLICATION

This Application is a continuation of U.S. Ser. No. 16/292,291 filed Mar. 5, 2019, titled "Hybrid Ingress Protected Connector and Adapter Assembly", which claims priority to U.S. Patent Application 62/651,679 filed Apr. 2, 2018, entitled "Hybrid Ingress Protected Connector and Adapter Assembly", and both are fully incorporated herein by reference.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds. Many installations, such as transmission towers or relay sites, however require electrical connections as well as power receivers and transmitters, for example. Signal towers may often be located at remote distances from telecommunication switching equipment and power connections, requiring that both signal conductors and power conductors be run between the signal tower and switching equipment.

Fiber optic connectors are provided for connecting optical fibers for transmitting light signals for data transmission, while electrical connectors are provided for connecting electrical conductors to power any electrically operated equipment. While data transmission may still be done with electrical conductors, with an increase in the number of broadband wireless installations, more fiber optic cables have been installed for transmitting data signals between signal towers and switching equipment. Electrical data conducting lines are typically run separately from power lines to minimize EMF interference and shielding constraints. Optical fibers of such systems have also typically been installed separately from electric power conductors, such that separate fiber optic connectors and electric power connectors were provided for connecting optical fibers and for connecting electric power conductors, respectively.

Hybrid connectors having both optical fiber and electrical connectors included in a single connector eliminate the need for providing two separate connectors. Electric wires and fiber optic cables may be run together in a single cable, and the ends of the cable may be terminated with a single hybrid connector that is configured to be coupled with an adapter to connect the optical transmission paths of the optical cable to other fiber optic cables or devices, and simultaneously connect the electrical wires to other electrical wires or devices. An adapter generally includes a housing, or portion of a housing, having at least one port which is configured to receive and hold a connector to facilitate the optical and/or electrical connection of one connector to another connector or other device. Adapters may be used to facilitate connections contained within a chassis. The term "chassis" as used herein broadly refers to a containment structure for housing electrical components or switching components.

In external applications wherein the adapters and connectors may be exposed to weather, particularly rain or moisture in general, the connectors may be configured as ingress protection (IP) connectors that are waterproof. A standard for such connectors may be an OVDA connector. While each of the various types of optical fiber connectors is different in construction, in order to minimize tooling and manufacturing costs, while also minimizing inventory (the number/variety of parts on hand), there is a need for a connector system having a single adapter and a single connector housing component that is mateable with the adapter, wherein the connector housing is configured to receive any of a plurality of different connector types (fiber optic and/or electrical) therein for mating of the connectors with other connectors.

SUMMARY

A connector system may include an adapter and a connector that is configured to be removably attachable with the adapter. The connector may be configured to receive any of a variety of clip-in attachments that may include different types of fiber optic connectors and/or electrical connectors capable of transmitting power, thereby providing a modular system. In various embodiments, the clip-in attachments may include, but are not limited to: only fiber optic connectors, such as, but not limited to, LC, SC, MPO connectors; electrical connectors, such as, but not limited to, RJ45 connectors, electrical socket connectors, power cabling, or electrical pin-type connectors; or hybrid connectors that include any of the listed fiber optic connectors and electrical pin-type connectors together in a single clip-in attachment.

According to one aspect, there is provided a connector system comprising a housing and a fiber optic connector clip insert removably coupled to the housing, and wherein the insert is removably coupled to a plurality of connectors including at least one of an optical fiber connector and an electrical connector. In some embodiments, the insert may be a clip. This connector clip assembly may include a flexible wing configured to engage a recessed opening of connector housing so as to couple the connector clip assembly to connector housing. The flexible latch may be a wedge shaped. In some embodiments, an interior surface of the connector housing may be keyed to match a corresponding surface of the connector clip assembly so as to allow coupling of the insert to the housing in a single orientation. The clip further includes a cover used to secure the fiber optic connectors and electrical cabling to the removably attached insert. The clip housing may be one piece securing the top and bottom cabling, or one piece surrounding a proximal end of the clip assembly. The clip assembly further comprises a snap-in that secures to a corresponding receiving surface on the assembly.

In some embodiments, the connector clip assembly may include a plurality of channels configured to receive a plurality of fiber optic connectors. Each of the plurality of channels may include a respective catch configured to engage a recess in a sidewall of a respective one of the plurality of connectors. In some embodiments, the connector clip assembly may include a respective tab configured to engage lead-in of a respective one of the plurality of connectors. Alternatively, the channel may just receive a distal end of the fiber optic connector, and the standard latch portion of the connector engages a corresponding recess, in an adapter, that depresses the connector latch. In various embodiments, the plurality of connectors may be a plurality of LC connectors or a plurality of SC connectors. In some embodiments, the connector clip assembly may include a plurality of connector clip inserts configured to hold at least one optical fiber connector. In some embodiments, at least one optical fiber connector may be an MPO connector.

According to some embodiments, the connector clip insert may be a hybrid clip and the plurality of connectors may include at least one optical fiber connector and at least one electrical connector. At least one optical fiber connector may be an LC connector, an SC connector, or an MPO connector. At least one electrical connector may be a pin contact, an electrical socket or an RJ45 connector. The hybrid clip may include a protective sheath disposed around one or more electrical connectors. The hybrid connector clip insert may be configured so as to hold at least one optical fiber connector and at least one electrical connector in a stacked arrangement. In some embodiments, the hybrid connector clip insert may include a bottom clip portion configured to hold at least one electrical connector, and a top clip portion disposed against the bottom clip portion so as to clamp at least one optical fiber connector therebetween.

In some embodiments, the housing may be configured to removably couple to any one of a plurality of different types of connector clip inserts. The plurality of different types of connector clip inserts may include a first connector clip insert and a second connector clip insert. The first connector clip insert may be a hybrid connector clip insert coupled to both an optical fiber connector and an electrical connector. The second connector clip insert may be coupled only to at least one optical fiber connector. The plurality of different types of connector clip inserts may further include a third connector clip insert coupled only to at least one electrical connector. In various embodiments, the connector housing may be configured to accommodate any number of different types of connector clip inserts.

According to some embodiments, the connector system may further comprise a coupling nut disposed around the housing. The connector system may comprise an adapter coupled to the housing by the coupling nut. The connector system may further comprise a coupling nut lock ring. In various embodiments, the housing may comprise a front portion and a rear portion. The rear portion of the housing may be threaded for receiving a cable strain relief member.

Various embodiments of connector systems disclosed herein may be ingress protected connector systems. Such systems may further comprise at least one weather proofing seal.

According to some embodiments, a connector system may comprise a housing, an insert removably coupled to the housing, and at least one connector removably coupled to the insert, the at least one connector including at least one of an optical fiber connector and an electrical connector. A connector may be an LC connector, an SC connector, an MPO connector, an electrical pin, an electrical socket, or an RJ45 connector.

According to another aspect, a connector system may comprise a housing configured to couple to any one of a plurality of different connector clip assembly, and at least one connector clip assembly configured to removably couple to the housing. Each one of the connector clip assembly clips may include at least one connector configured to removably couple to a connector clip insert coupled to the connector clip assembly, and the connectors may be optical fiber connectors and/or electrical connectors. In various embodiments, a fiber optic connector may be an LC connector, an SC connector, an MPO connector, an electrical pin, an electrical socket, or an RJ45 connector.

According to another aspect, a connector clip assembly may comprise a housing a with a pair or lead-ins. The lead-ins extend from a proximal end of the connector housing. The lead-ins extend beyond a proximal end of a ferrule to protect the ferrule from damage when the hybrid IP assembly is connected to a corresponding panel or inserted into an adapter portion without a line of site when mating.

According to another aspect, a connector system may comprise a housing with a pair of lead-ins, the lead-ins are of similar radius but of differing lengths. Each lead-in can only engage its corresponding recess on an inside receiving port of an adapter, thus requiring a blind mating of the connector to the adapter. The different shape between the lead-ins or plural of lead-ins ensures the hybrid assembly is inserted and align so the fiber optic connectors have proper polarity (e.g. Tx, Rx) and power has the correct source and return.

The invention is described with a proximal end closer to the fiber optic and power connections that are connected to a panel or enclosure and a distal end closer to a cable gland. Various features disclosed in conjunction with some embodiments may apply to other embodiments.

BRIEF DESCRIPTION OF THE FIGURES

FIG. 4A is a perspective view of a cable gland body.

FIG. 4B is a perspective view of an end cap forming a cable gland assembly.

FIG. 6A is a side perspective view of a locking ring.

FIG. 6B is a perspective front view of FIG. 6A.

FIG. 6C is a perspective rear view of FIG. 6A.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors and/or electrical connectors therein to align and connect optical fibers end-to-end, or allow for pin/socket electrical connections. For weatherproof or waterproof installations, the connectors may include protective housings and seals to inhibit water penetration. Such connectors may be named IP connectors, or Ingress Protection connectors, and may include different levels of 'ingress protection' depending on the environment to which they will be exposed. While the general discussion herein is directed to IP connecters, the invention is not meant to be limited to such and may also be applied to other types of connectors as well.

Figure 1:
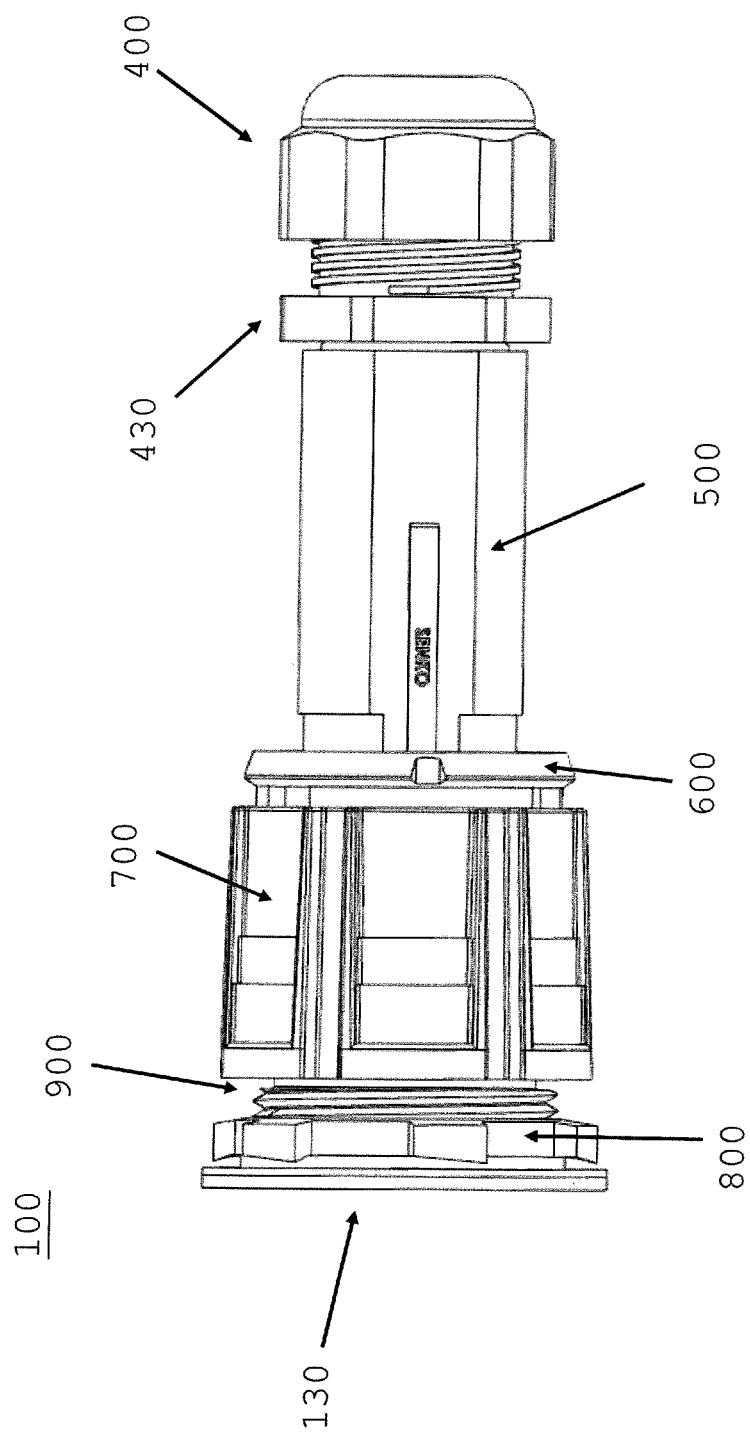
FIG. 1 is a perspective view of an ingress protection (IP) fiber optic connector and adapter assembly according to an embodiment.

In an embodiment as represented in FIG. 1 a hybrid IP assembly 100, a proximal end of the assembly 130, a locking nut 800, an adapter body 900, a bayonet nut 700, a lock ring or safety ring 600, a connector 500, a cable gland body 430 and cable gland nut 400. The connector 500 may contain optical fibers and/or electrical wires. Cabling (not shown) may terminate within the housing 500 and any optical fibers and/or electrical wires of the cable may themselves be terminated by various types of connectors. A bayonet 700 and a locking ring 600 secures the housing 500 to the adapter 900. The adapter 900 may be secured to a chassis, bulkhead, or panel (not shown), or other type of enclosure structure via locking nut 800.

Figure 2:
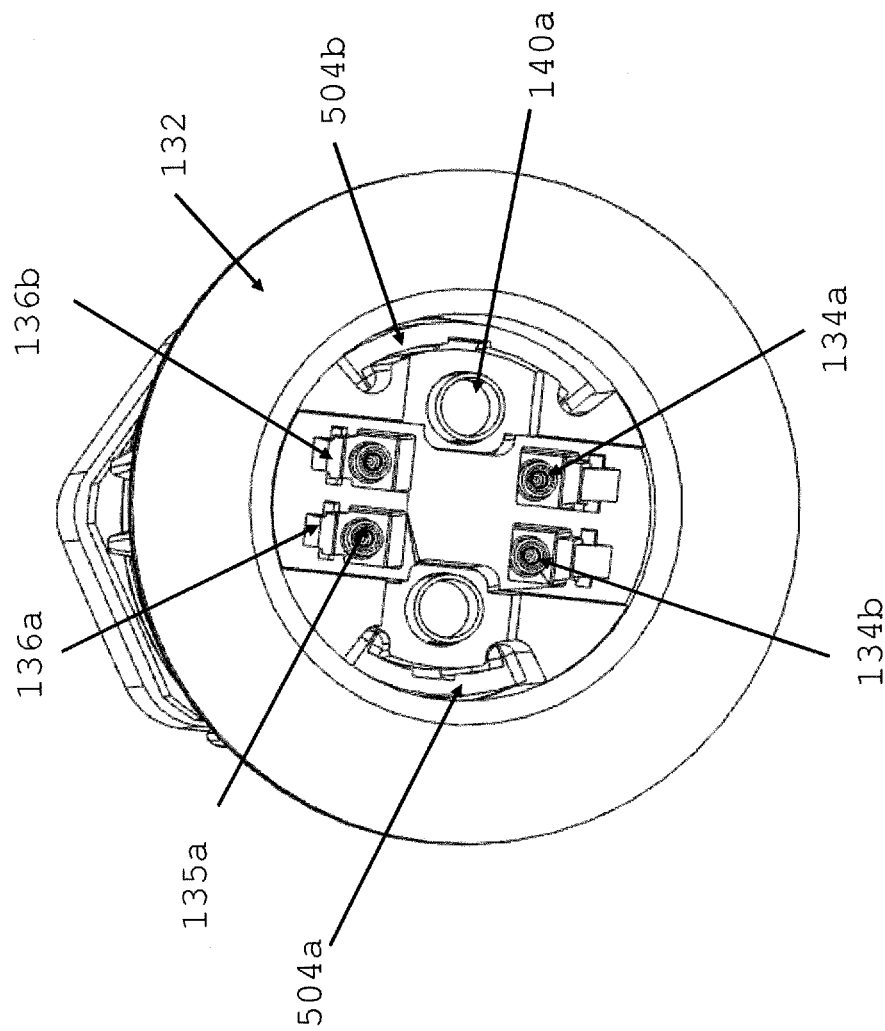
FIG. 2 depicts a front view of the IP connector of FIG. 1.

Referring to FIG. 2, a front view of the hybrid IP assembly 100 is an adapter body 130 showing an adapter housing face 132 positioned inside a panel wall and secured with locking nut 800 (not shown) on an opposite side of the panel wall (not shown), which secures assembly 100 in place. The in-line adapter houses a connector clip insert 1000 (refer to FIG. 10) and connector clip assembly (refer to FIG. 14). A pair a recesses (504a, 504b) of differing lengths at the distal end of adapter 900 accept pair of lead-ins (502a, 502b FIG. 5A) at a proximal end of connector housing 560. The recesses and lead-ins allow for blind mating as described below. One or more power pins (140a, 140b) are located in the connector clip assembly and a plural of fiber optic connectors, in this case standard LC connectors, can be accepted in a port (134a, 134b) of the connector clip assembly. Each port further contains an alignment sleeve for accepting a proximal end of a connector. Connector clip assembly further comprises a recess or opening (136a, 136b) that accepts and depresses a standard latch on a LC fiber optic connector. Differing fiber optic connectors and latch can be inserted into connector clip assembly designed for the same without departing from the scope of the invention. Connector housing 560 is inserted into adapter 900 at distal end and blind mated as described below.

Figure 3:
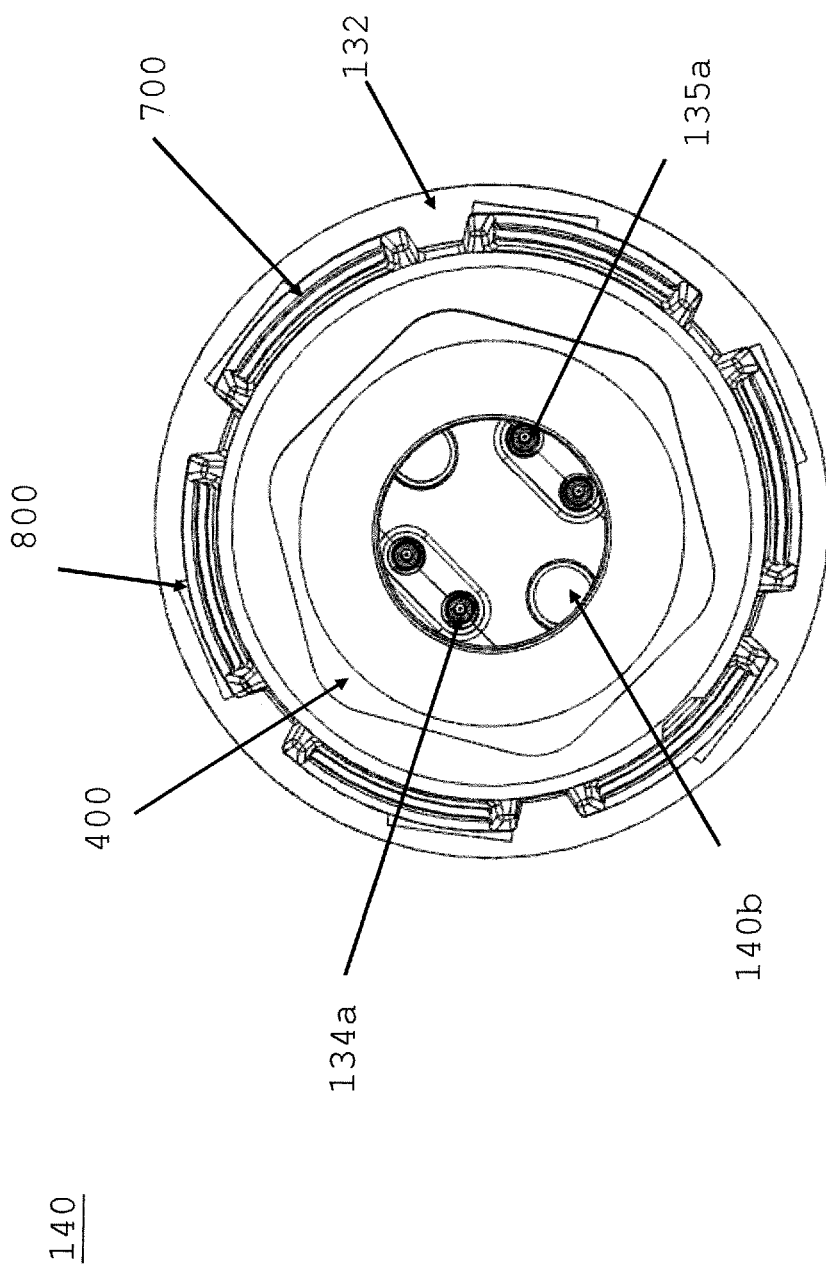
FIG. 3 depicts a rear view of the IP connector of FIG. 1.

Referring to FIG. 3, a rear view of the hybrid assembly 100. From the rear view, locking nut 800, bayonet nut 700 and cable gland 400 are shown. The power is distributed via power pin 140b alongside fiber optic signal paths (134a, 135a) via cabling (not shown) that is connected to a radio unit on a cell tower. The power is received from the enclosure or panel is distributed via pin 140b to the cell tower.

Figure 4C:
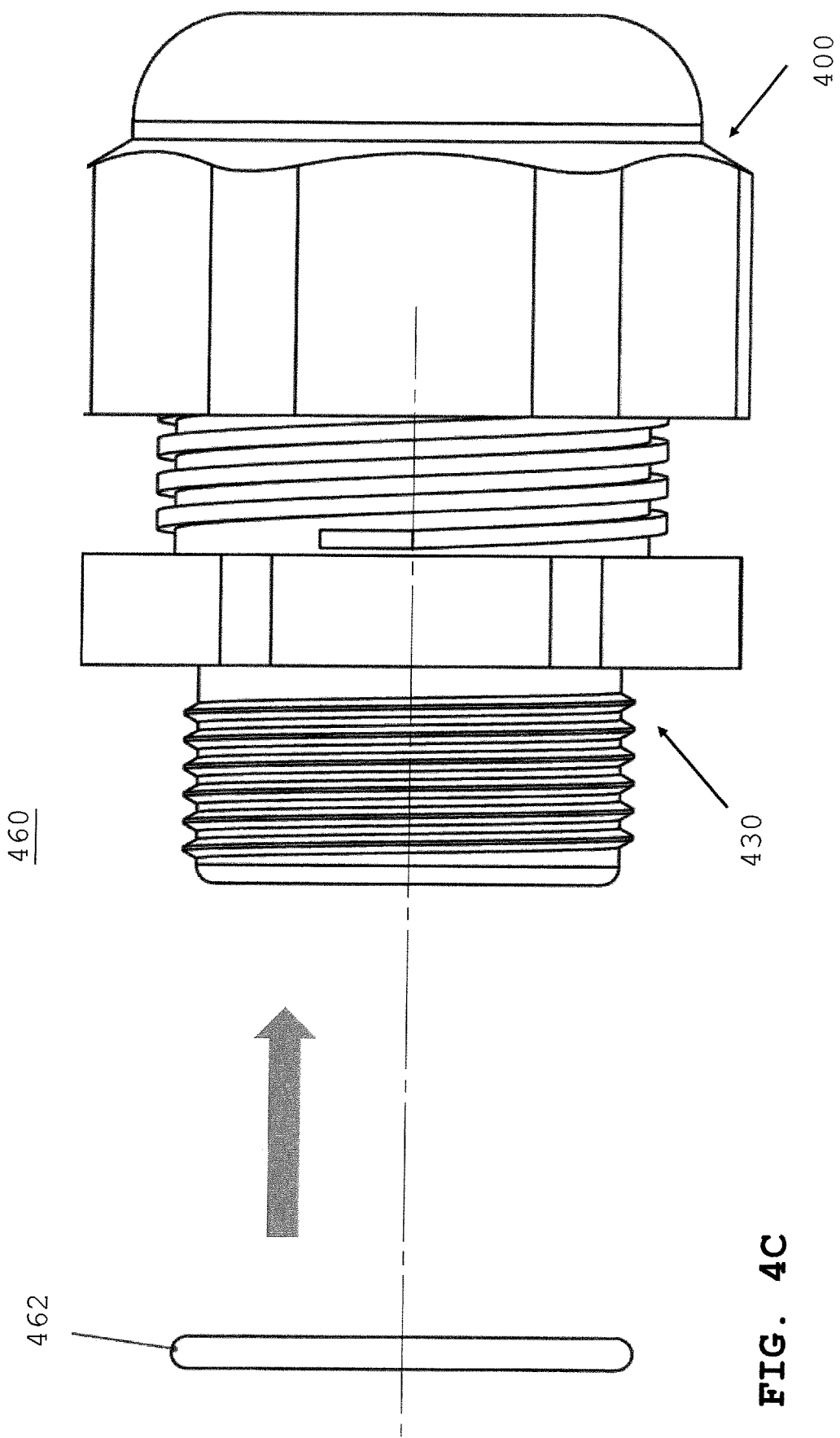
FIG. 4C is an exploded view of a seal prior to installing at a proximal end of the cable gland assembly.

Referring to FIG. 4A, a cable gland compression nut 400 is screwed on a distal end of a cable gland 430 (FIG. 4B), and attached in arrow direction C1. Referring to FIG. 4B, as threads 402 and cable gland threads 436 are mated, the nut 400 compresses a plural of compression fingers 438 that compress seal 438a that is circumferential retained on an inside surface at a distal end of the cable gland. This provides an environmental seal. Threads 432 are threaded into a distal end of connector 500 in the direction of arrow C2. Referring to FIG. 4C, threading cable gland 400 into distal end of connector 500 compresses seal 462 to protect against environmental ingress.

Figure 5A:
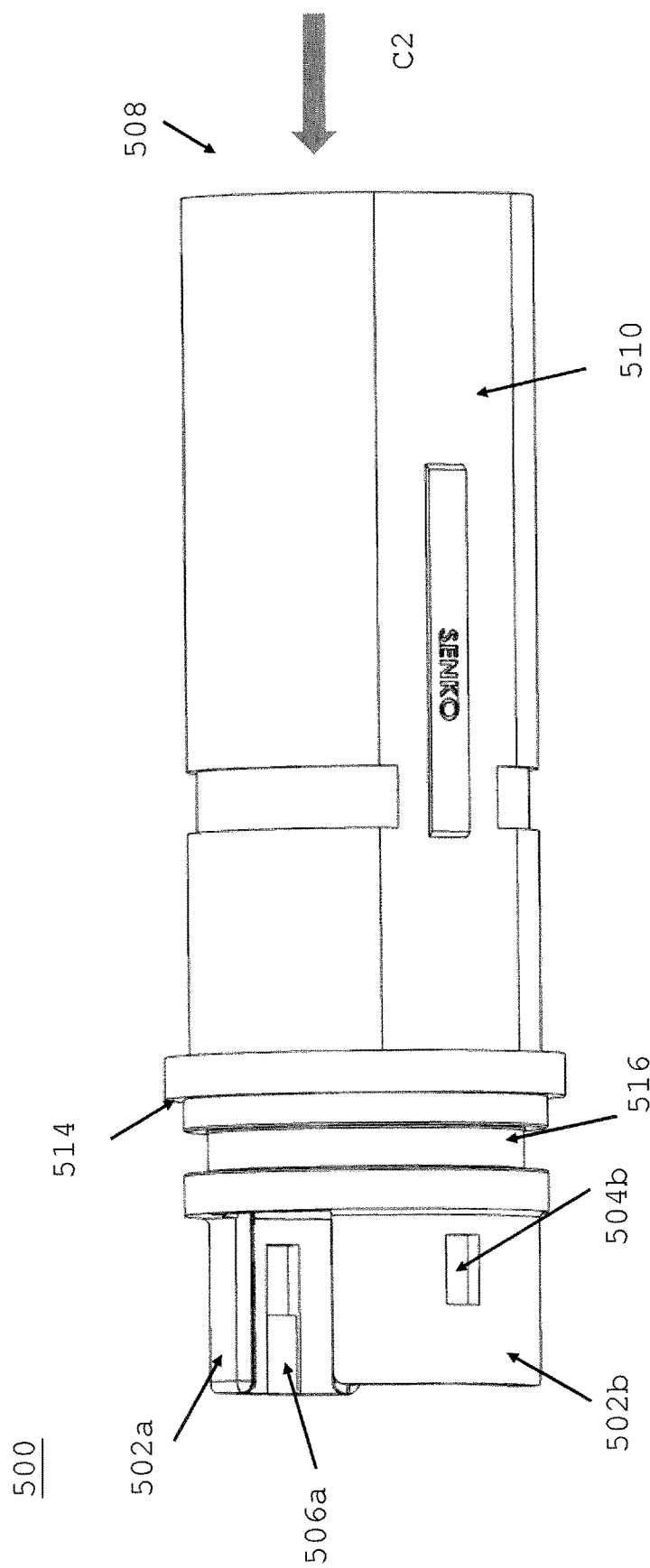
FIG. 5A is a perspective view of a connector housing according to an embodiment.
Figure 5B:
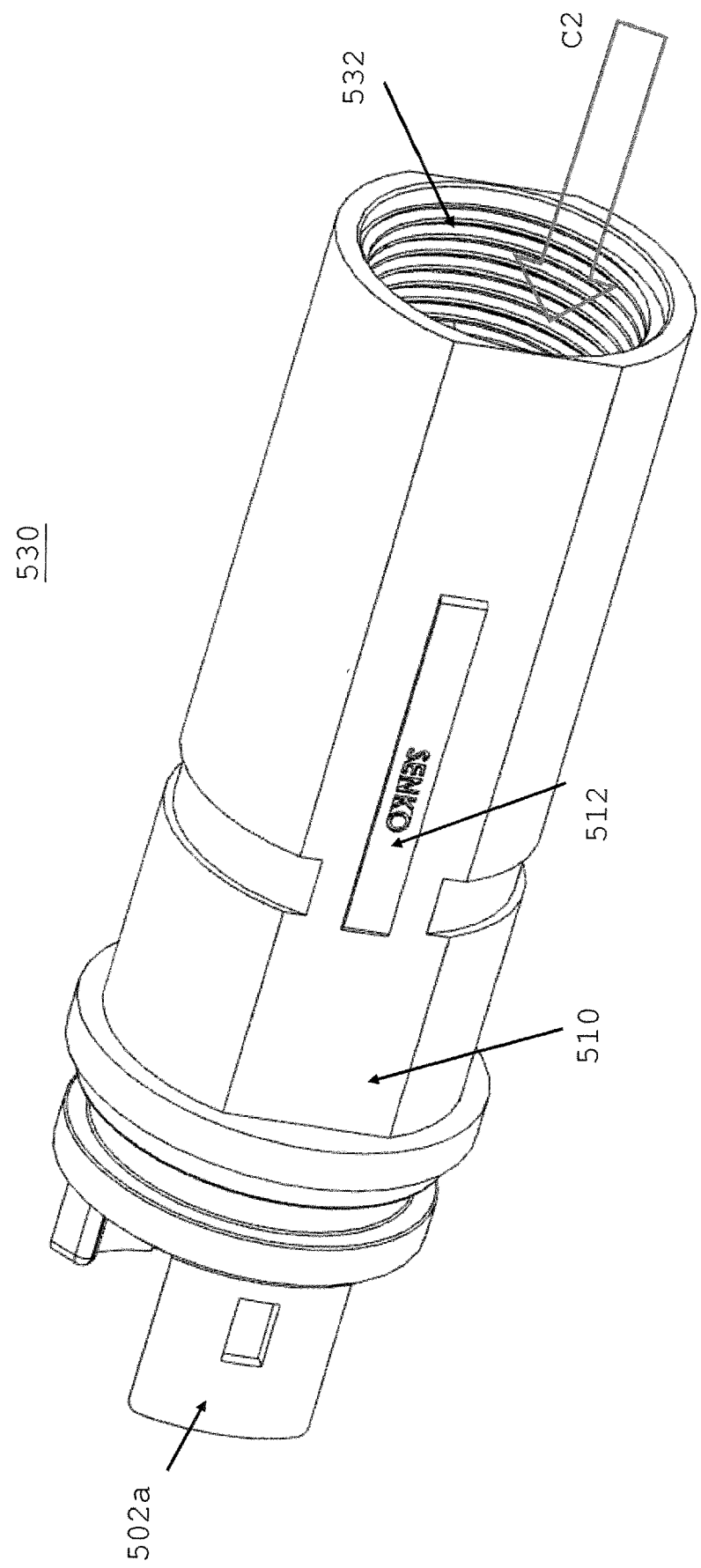
FIG. 5B is a perspective side view from a distal end showing a housing of a connector according to an embodiment.

Referring to FIG. 5A, a connector 500 at a distal end 508 receives a proximal end of cable gland assembly 460 in a direction of arrow C2. The connector outer body contains a lengthwise flat 510 with a raised surface 512 (FIG. 5B). The proximal end contains a pair of lead-ins (502a, 502b) with a connector clip opening (504a, 504b). The opening 504b (504a not shown but located on lead-in 502a), accepts a flexible wing 1406a to secure connector clip assembly 1400 at proximal end of connector 500. The connector clip assembly 1400 is retained within adapter 900. Flange face 514 mates to top of adapter housing 908 (refer to FIGS. 9A, 9B). Surface 516 receives an O-ring seal to further prevent environment ingress. Connector clip channel guide 506a is described below. Referring to FIG. 5B, the lock ring guide 512 ensures locking ring 600 when pushed toward a proximal end of connector 500 is retained prior to being threaded into a distal end of bayonet nut 700.

Figure 5C:
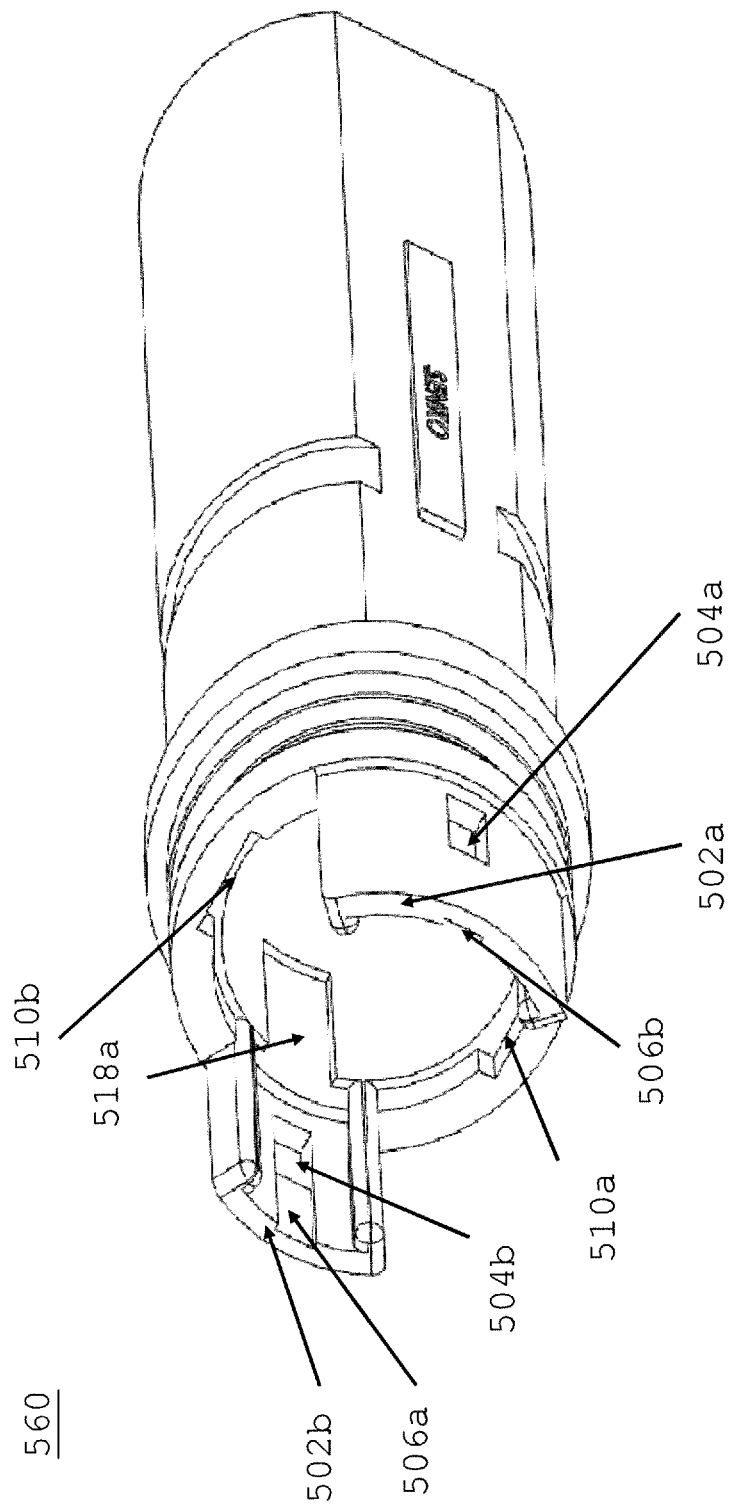
FIG. 5C is a perspective side view from a proximal end showing a housing of a connector according to an embodiment.
Figure 13A:
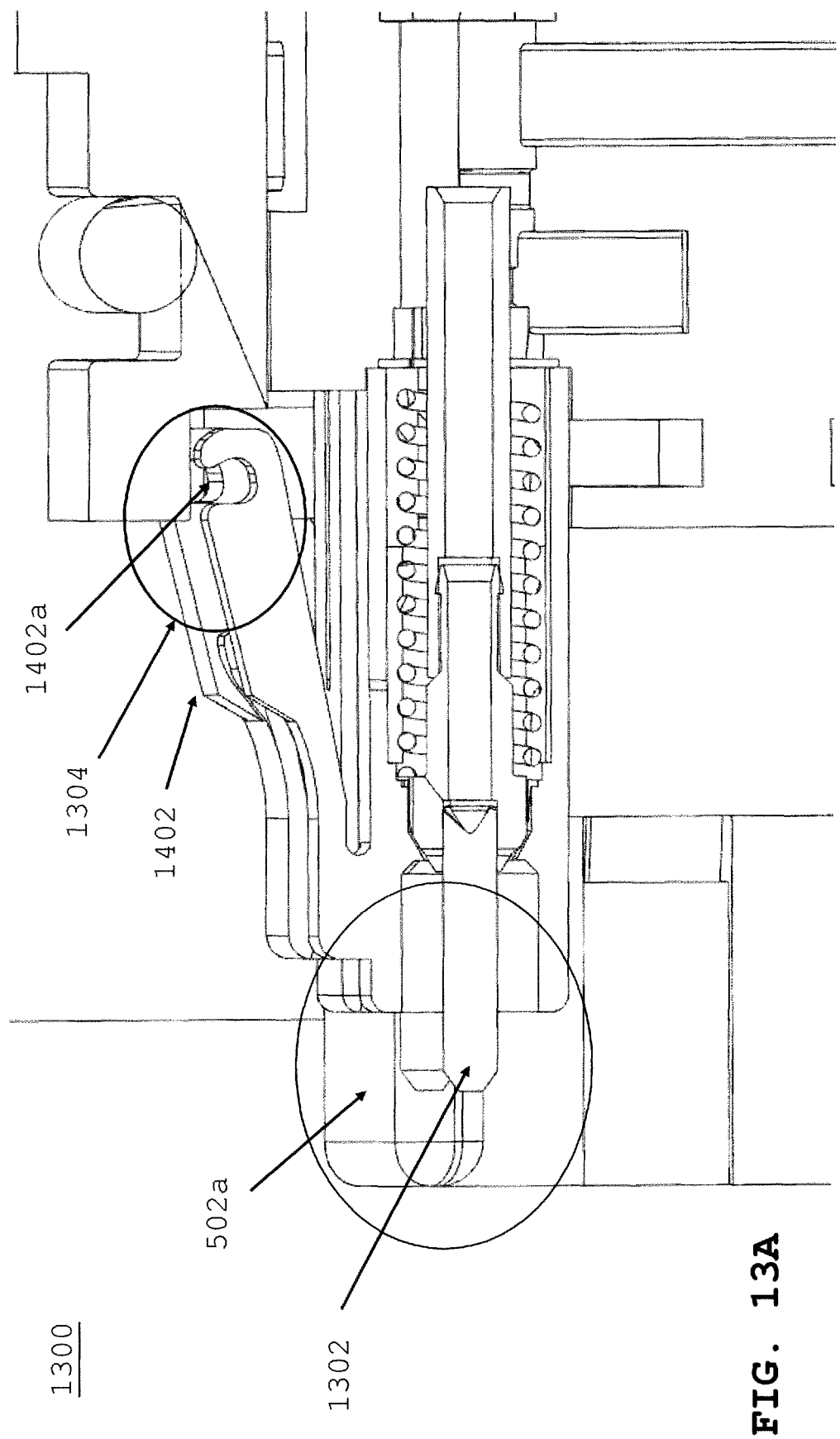
FIG. 13A is a cross-section view of a proximal end of hybrid connector showing a lead-in and ferrule assembly.

Referring to FIG. 5C, a proximal end of connector housing 560 has a pair of lead-ins (502a, 502b) that mate with corresponding recesses in an adapter 900 (not shown). The lead-ins have the same radius but differing lengths. The length difference allows the connector 500 with locking nut 600 to be rotated until each lead-in (502a, 502b) mates with a corresponding adapter recesses (138a, 138b) (refer to FIG. 9B) via corresponding channels (506a, 506b) without having a line of sight to or visual of the lead-ins connecting or mating into adapter recesses (138a, 138b), called blind mating. A pair of recesses (504a, 504b) accept wings (1406a, 1406b) when connector clip assembly 1400 mates with connector housing 560. Cutout 518a prevents connector clip assembly 1400 from rotating and aids in aligning the connector clip assembly 1400 so its flexible wing 1406a snaps into corresponding opening 504a. Channel 506a guides the connector clip assembly into position once the lead-ins are in their proper recess. Cutouts (510a, 510b) accept and depress latches 1402 of connector clip assembly 1400. Referring to FIG. 13A, a depressed latch is shown at call out 1304. Still referring to FIG. 13A, the lead-ins 502a extended beyond a corresponding ferrule 1302. Proximal end of the lead-in 502a protects the ferrule from damage when performing a blind connection of the connector 500 into adapter 900.

Figure 7B:
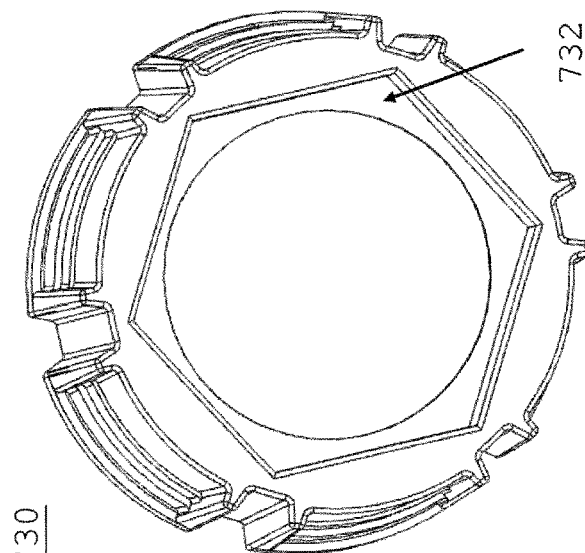
FIG. 7B is a perspective front view of FIG. 7A.

Referring to FIG. 6A, a side view of a lock ring or safety lock ring 600 ensures bayonet nut 700 does not rotate when the ring is secured at a distal end of the nut 700. Upon inserting ring 600 into the distal end of nut 700, facing surface 664 (FIG. 6C) of protrusion 608 of the nut, is seated into corresponding recess 732 (FIG. 7B). Referring to FIG. 6B, cutouts (638a, 638b) receive raised surface 510 on connector 500 (FIG. 5B), which provides a temporary retention near the distal end of nut 700 prior to pressing therein. Referring to FIG. 6C, recess opening 626 accepts a removal tool to loosen safety nut 600 from distal end of nut 700.

Figure 7A:
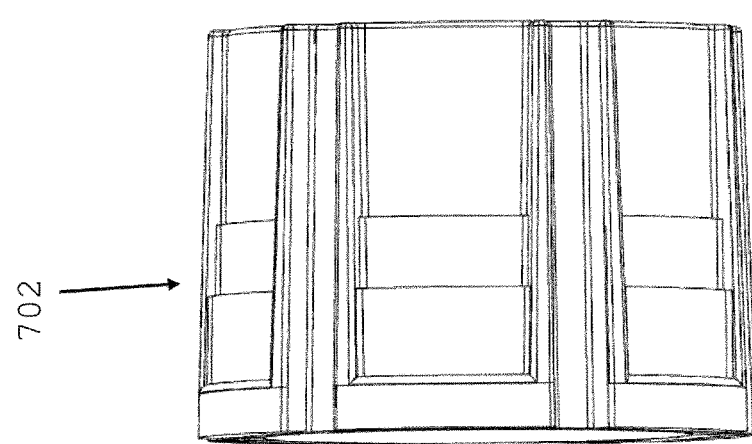
FIG. 7A is a side perspective view of a bayonet nut.
Figure 7C:
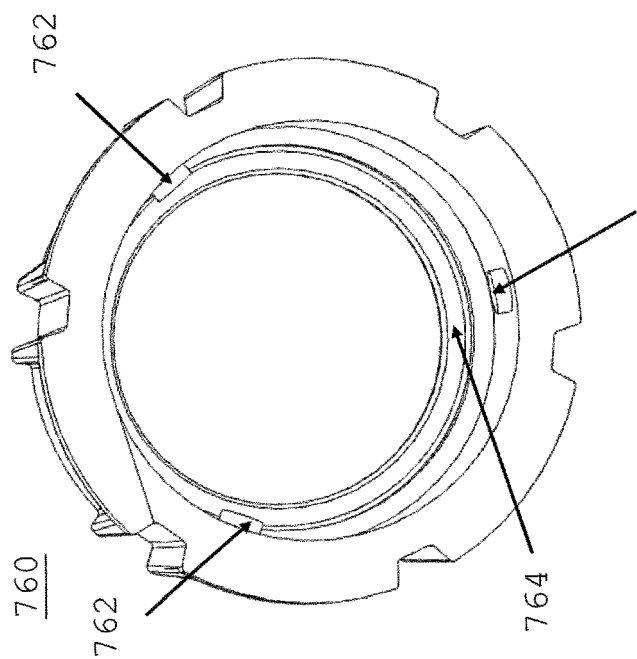
FIG. 7C is a perspective rear view of FIG. 7A.

Referring to FIG. 7A, bayonet nut 700 outer surface 702 has a varied pattern to assist with gripping. Referring to FIG. 7B, recess 732 accepts a proximal end of safety nut 600. Referring to FIG. 7C, a spring washer (not shown) is placed over mating surface 764, and applies a bias force in a distal direction against bayonet nut while in locked position via pins 762, which are secured in a corresponding groove 902 at outer housing of adapter 900.

Figure 8:
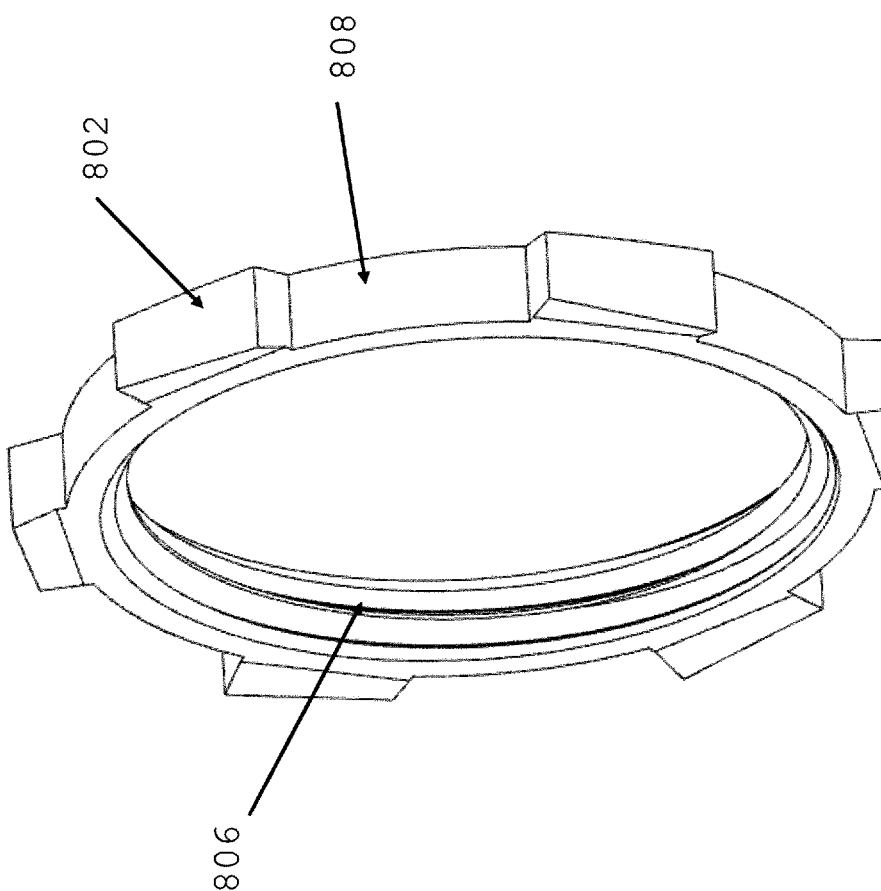
FIG. 8 is a perspective view of a lock nut.

Referring to FIG. 8, lock nut 800 is threaded on to adapter housing via thread 806, and teeth 802 with a plural of cutting edges 802a, are spaced along a lock ring body 808, and each tooth digs into outer surface of panel enclosure (not shown) to secure hybrid assembly 500 thereto.

Figure 9:
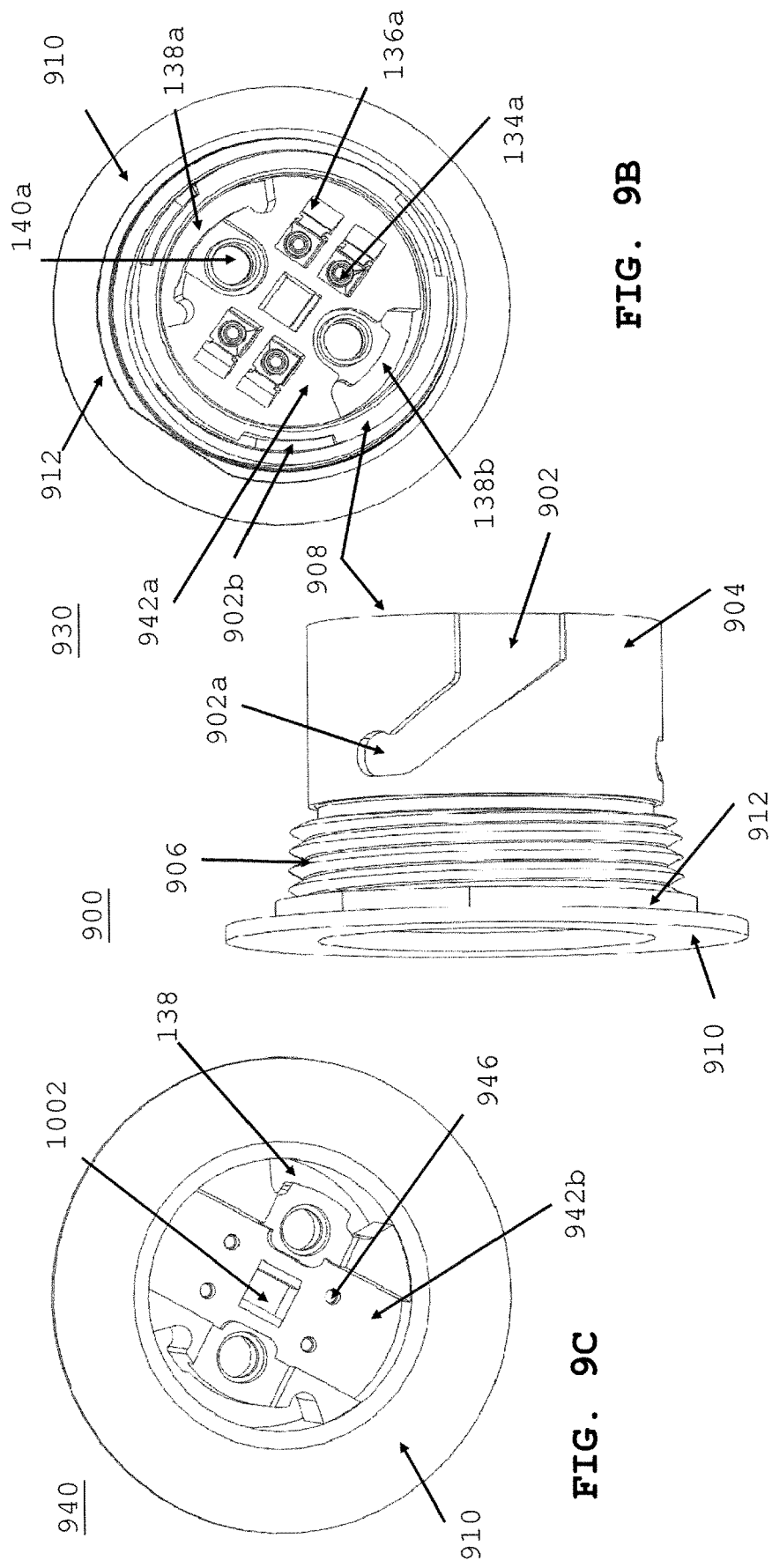
FIG. 9A is a side perspective view of an adapter assembly.
FIG. 9B is a perspective front view of FIG. 9A.
FIG. 9C is a perspective rear view of FIG. 9A.

Referring to FIG. 9A, outer housing of adapter assembly 900 secures the hybrid IP assembly to a panel via locking nut 800 threaded onto threads 906. Adapter face 906 is positioned on an opposite side of the panel wall from nut 800. Bayonet nut 700 pins 762 are accepted in grove 902 and upon turning clockwise, a pin 762 is seated in recess 902a. As bayonet nut 700 is rotated inner threads (not shown) engage with adapter threads 906 to secure bayonet nut 700 onto adapter assembly 900. Referring to FIG. 9B, front view 930 of adapter assembly 900 contains the clip assembly therein, with power pins 140a, recesses (138a, 138b), and access point 902b for pins 762 to its corresponding groove 902. Referring to FIG. 9C, a distal view or rear view 940 of adapter assembly 900 shows rear view 942b of adapter insert seat 942a. Seat 942a receives an in-line adapter connector clip insert 1000. Fiber optic pathways 946 receive a fiber cable via openings 946. Proximal end of clip 1002 (FIG. 10) is shown. Openings 946 may contain an alignment sleeve to align and secure a ferrule at a proximal end of a fiber optic connector.

Figure 10:
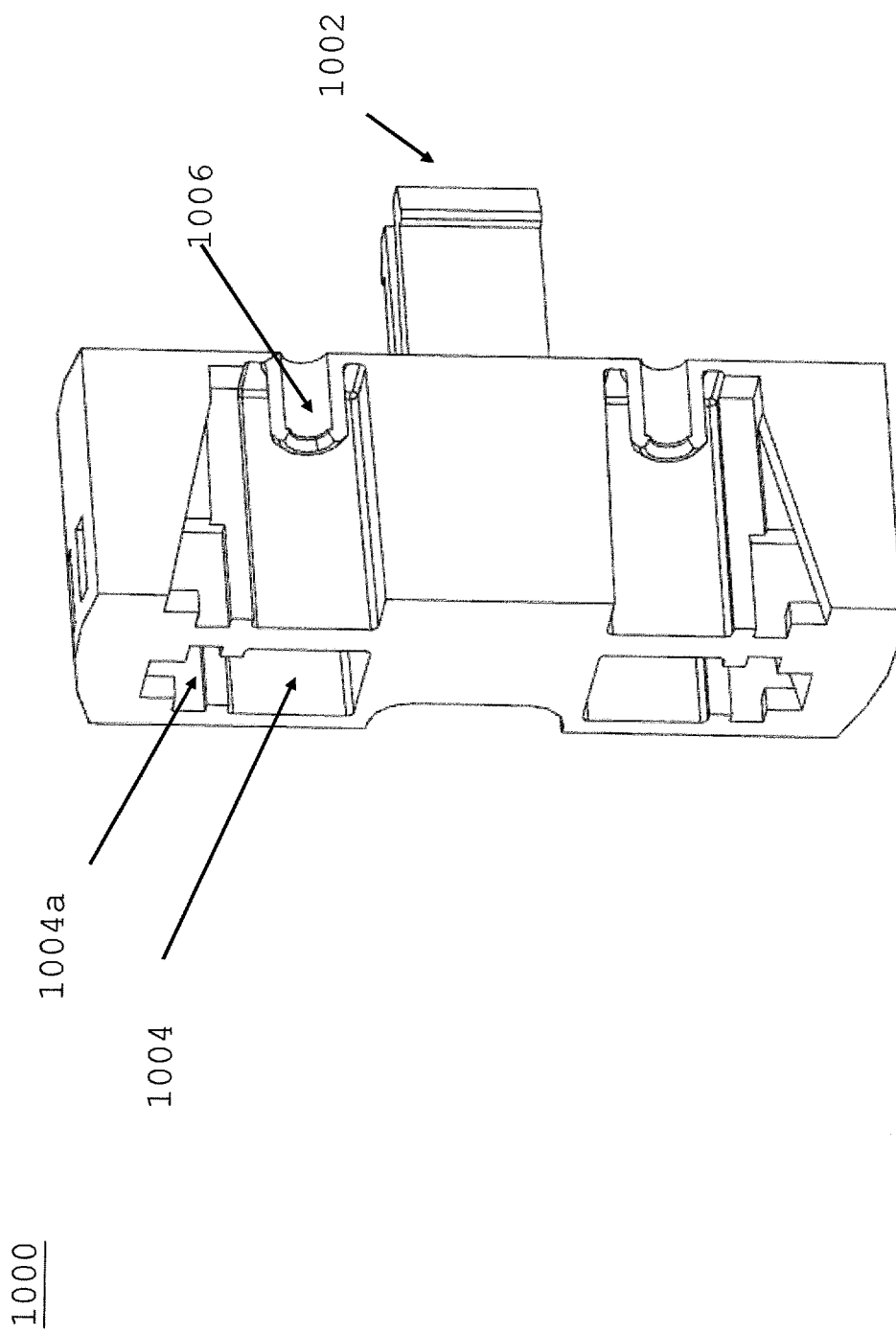
FIG. 10 is a side-front perspective view of a connector clip insert.
Figure 11:
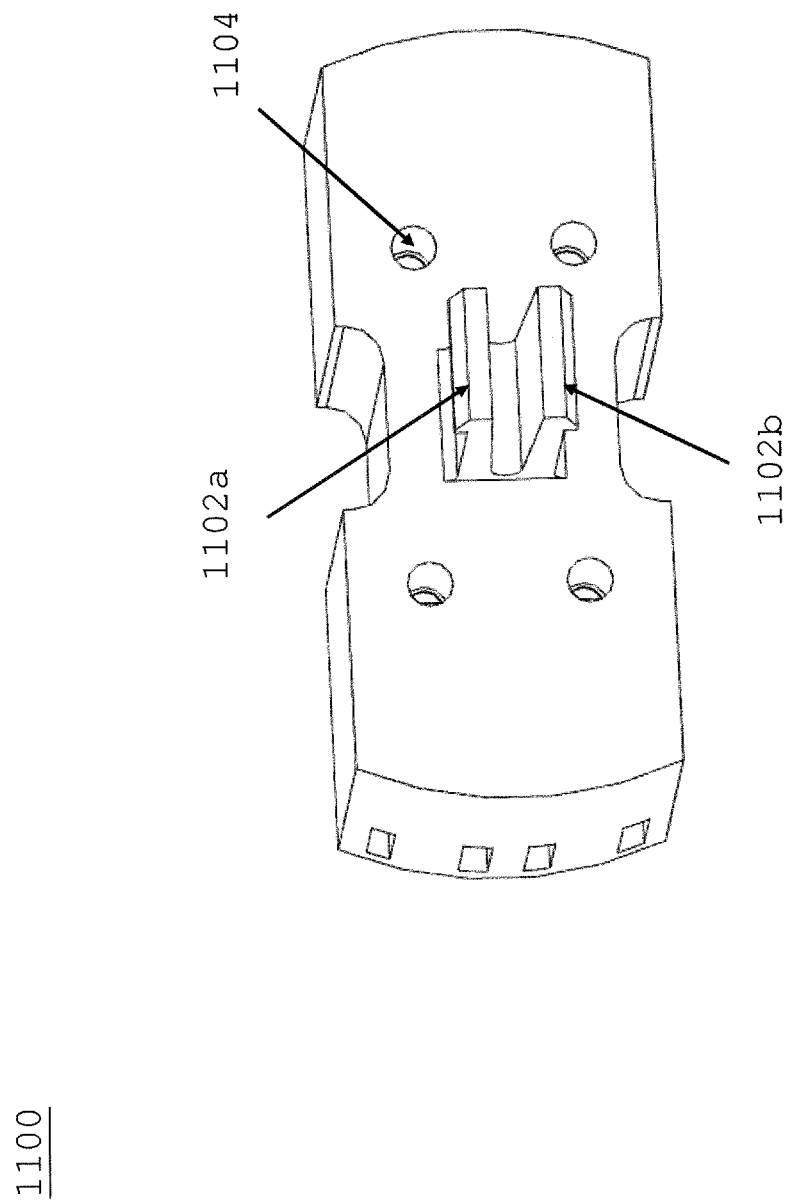
FIG. 11 is a rear-side perspective view of the FIG. 10 insert.

Referring to FIG. 10, in-line adapter connector clip insert 1000 comprises one or more ports 1004 that receive a fiber optic connector. The port contains an alignment sleeve 1006 to accept a ferrule. A clip 1006 is used to secure in-adapter connector clip insert 1000 to adapter insert on seat 942a within adapter 900. Referring to FIG. 11 a distal end of second in-line adapter connector clip insert 1100 shows a pair of clips (1102a, 1102b) and fiber optic pathways 1104. Second in-line adapter connector clip insert 1100 is secured in adapter 900 by clips 1102a, 1102b.

Figure 12:
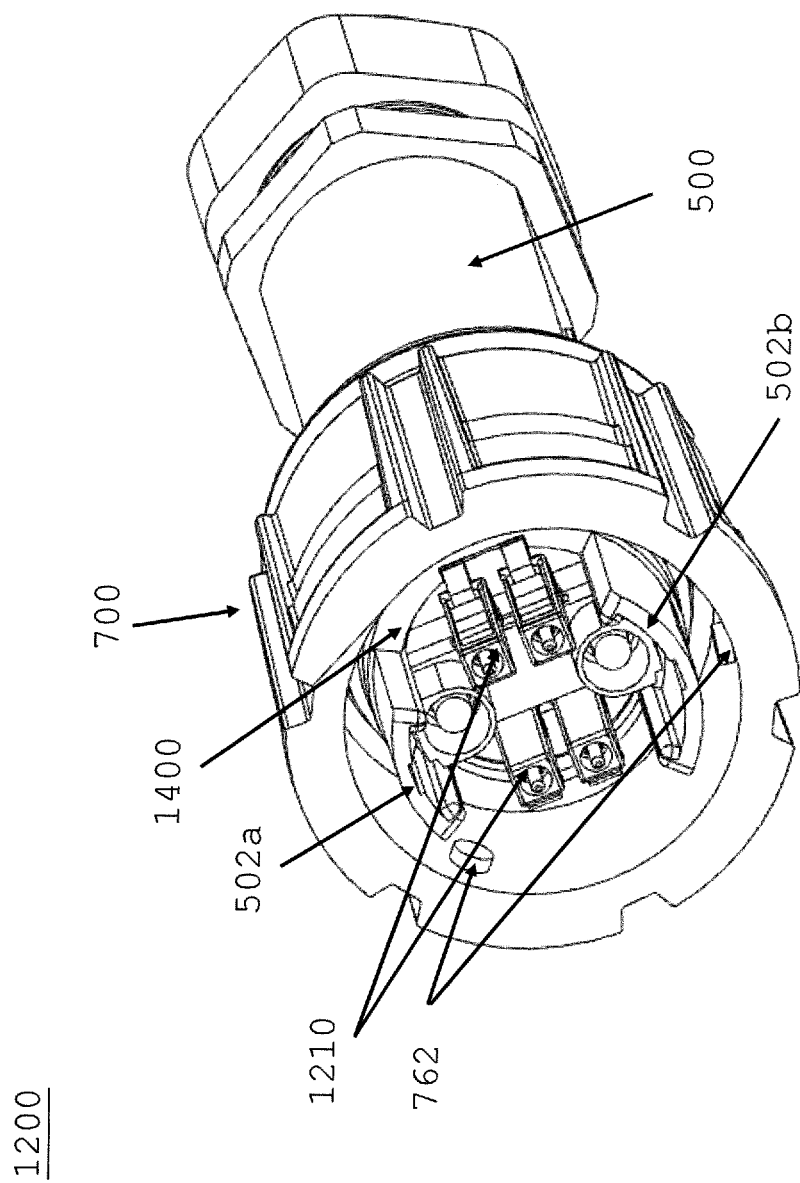
FIG. 12 is a front-side perspective view of a hybrid IP connector-adapter with fiber optic and power connections.

Referring to FIG. 12, bayonet nut 700 has a connector clip assembly 1400 inserted at a proximal end of assembly 1200 with a plural of fiber optic connectors 1210. Pins 762 engage into grooves 902 on outer surface of adapter assembly 900, at groove 902, connecting assembly 1200 to adapter 900. Upon aligning lead-ins (502a, 502b) into recess (138a, 138b) of adapter 900, the fiber optic connectors and power pins shown will mate with an adapter insert 100. Adapter 900 is then secured to a panel wall (not shown), with flange face 910 on one side of the wall (ready to accept corresponding fiber signals and power) through a proximal end of adapter 930.

Figure 13B:
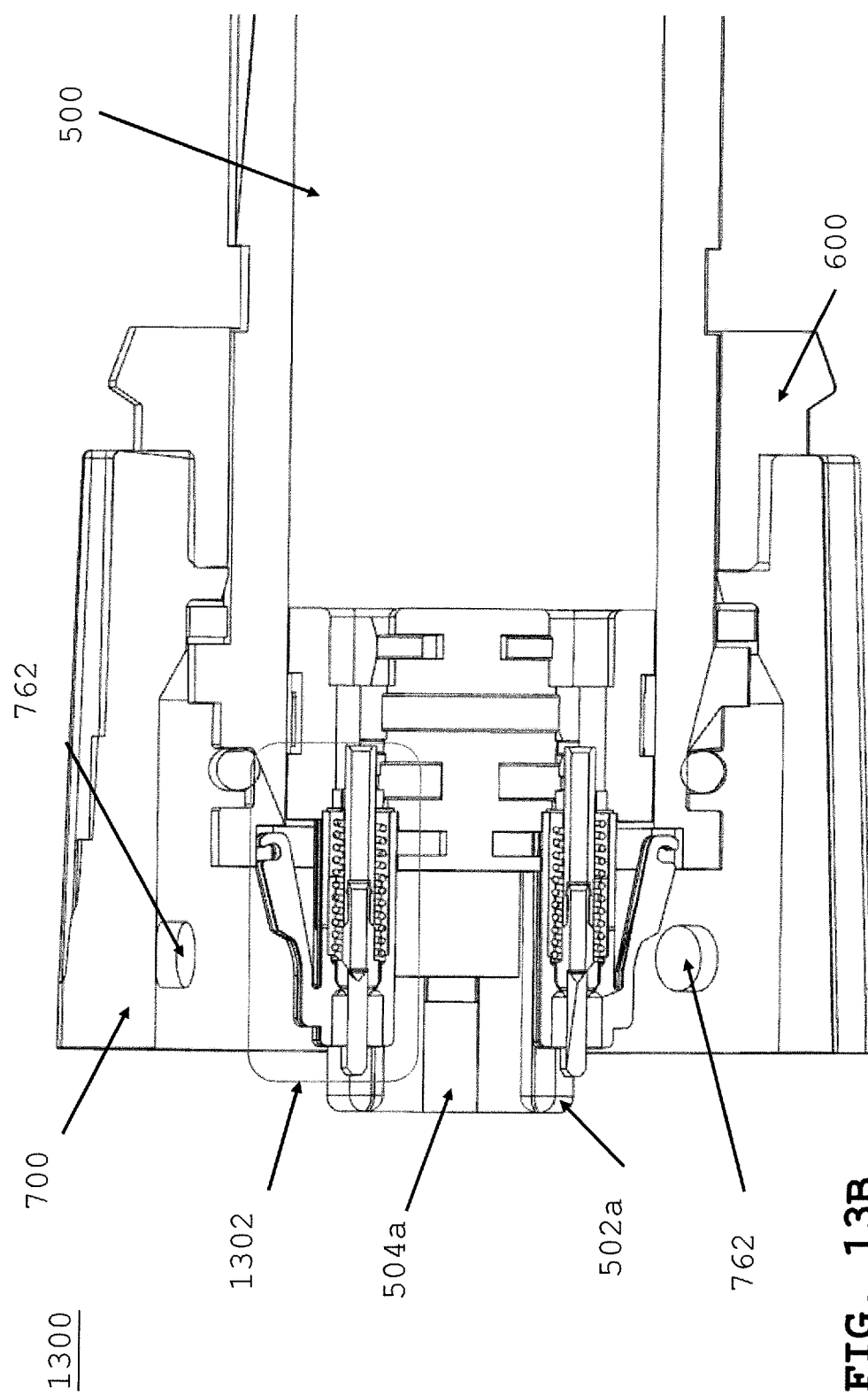
FIG. 13B is a cross section view of a proximal end of hybrid connector.

Referring to FIG. 13A, lead-in 502a extends beyond a ferrule 1302, the extension protects the ferrule tip when connector housing 560 is inserted into adapter 900. Latch 1402 is depressed by recess 1004a as shown at call out 1304. Referring to FIG. 13B, call out 1302 shows fiber optic connector seated in port 1004, with lead-in 502a extending beyond the proximal end of connector 1200. Other numerals are defined in more detail herein.

Figure 14:
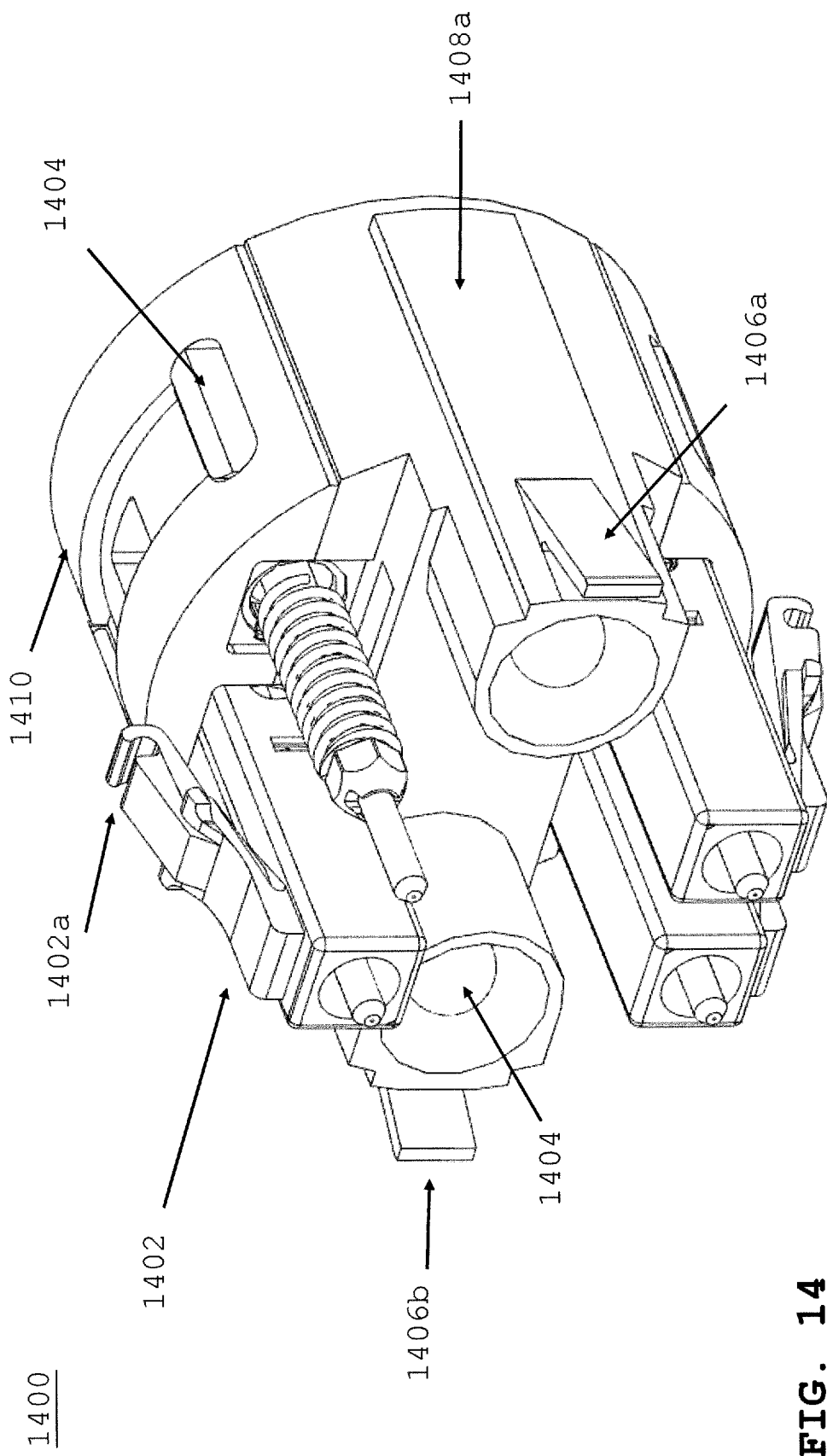
FIG. 14 is a side-front perspective view of a hybrid connector clip assembly.
Figures 15A, 15B:
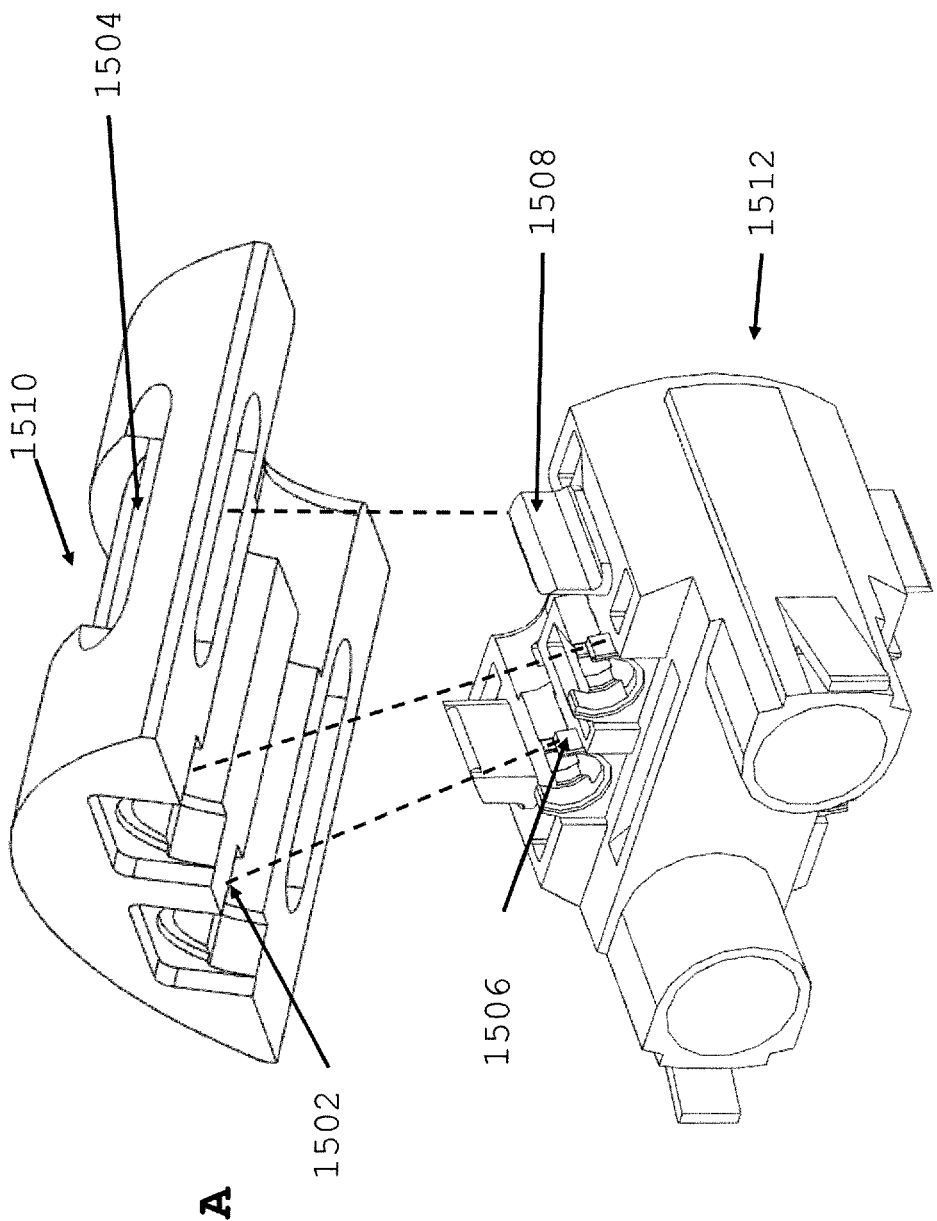
FIG. 15A is a perspective view of the lower half connector clip cover.
FIG. 15B is a partial view of a connector clip assembly prior to insertion of the cover of FIG. 15A.

Referring to FIG. 14, connector clip assembly 1400 is inserted in a proximal end of connector 500. Wings (1406a, 1406b) engage corresponding openings (504a, 504b) in lead-ins (502a, 502b) (refer to FIG. 5C) to secure assembly therein. The fiber optic connectors 1402 are secured in connector clip assembly 1400 under cover 1410 as shown in assembly 1500 (FIG. 15A). Power pins 1404 are likewise secured under cover 1510. Snaps 1404 on either side assembly secure the cover 1410 to lower half 1512 of connector clip assembly 1400. Referring to FIG. 15A, clip protrusion 1508 engages snaps 1504 as shown by dotted line. The fiber optic connector housing is secured under cover 1510 when the recess 1502 fits over tab 1506.

Figure 16:
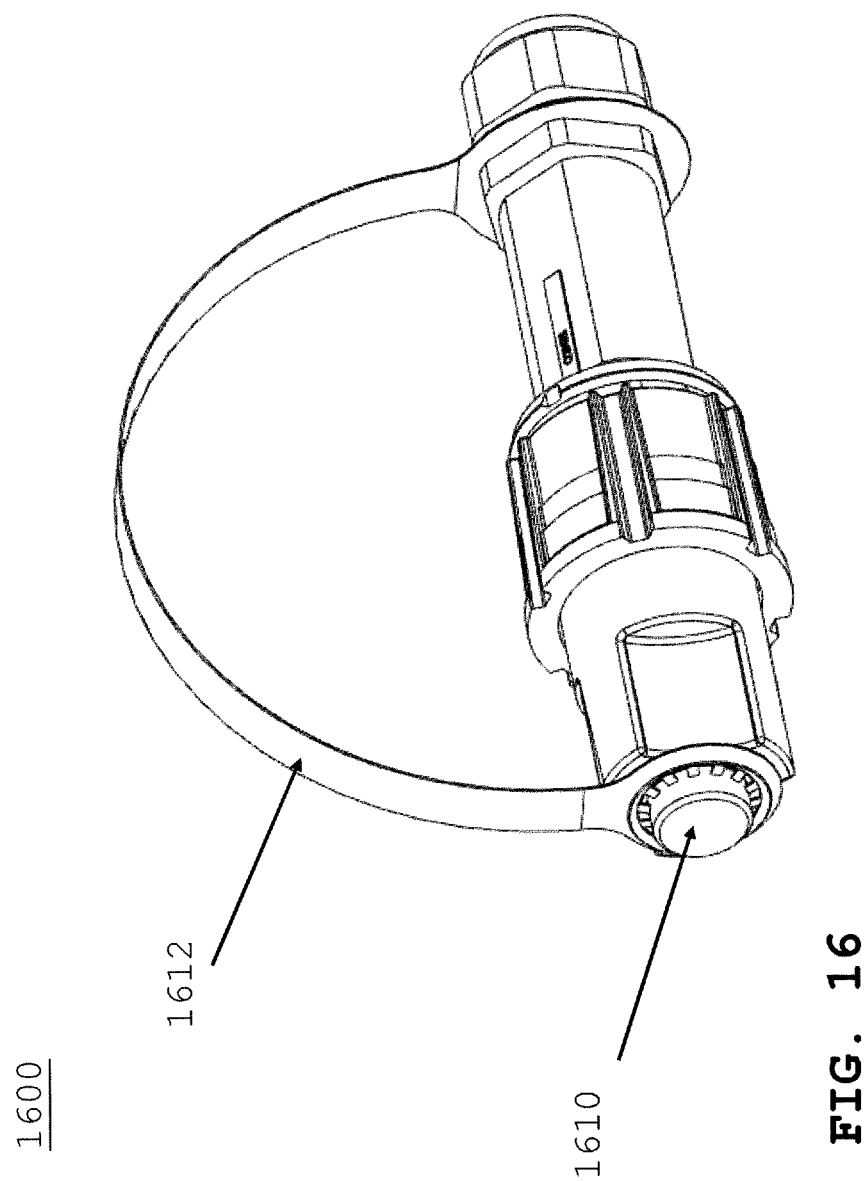
FIG. 16 is perspective view of a Hybrid IP assembly with a dust cap and tether.
Figure 17:
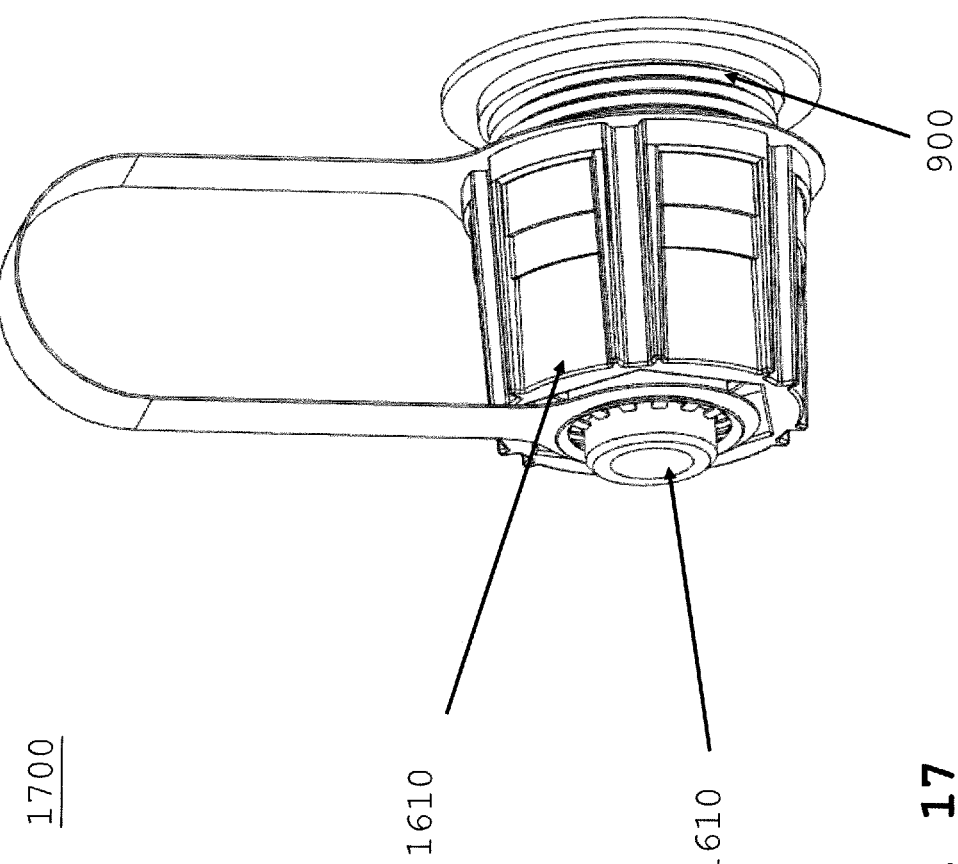
FIG. 17 is a perspective view of the adapter with the dust cap and tether according to another embodiment of the invention.
Figure 18:
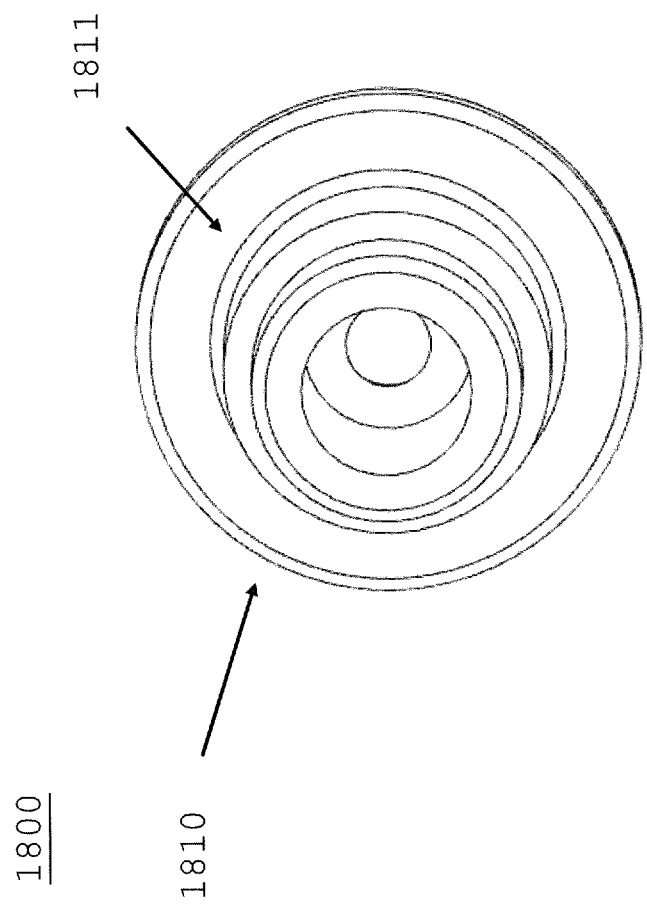
FIG. 18 is a perspective view of the inner sealing surface of a dust cap.

Referring to FIG. 16, a dust cap 1610 is placed over a proximal end of hybrid connector 100 with a tether 1612 attached near cable gland. Referring to FIG. 17, the dust cap 1610 is tethered at a proximal end of the adapter 900. Referring to FIG. 18, inner sealing surface 1811 of dust cap 1810 is shown.

Various parts, components or configurations described with respect to any one embodiment above may also be adapted to any others of the embodiments provided. Various embodiments including LC connectors as described above may be configured with SC connectors, and various embodiments including SC connectors as described above may also be configured with LC connectors.

This disclosure is not limited to the particular systems, devices and methods described, as these may vary. The terminology used in the description is for the purpose of describing the particular versions or embodiments only, and is not intended to limit the scope. Locking arm (14c) may be more than one locking arm (14c), and each locking arm may have the same features such as raised surface (14c.1) and distinguished between locking arms by (14c.1(a) and 14c.1(b)).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An adapter for connecting a fiber optic and/or electrical connector to another fiber optic and/or electrical connector, the adapter comprising:
   a tubular body having opposite, first and second open ends spaced apart along an axis of the tubular body, the first open end being configured to accept one of the fiber optic and/or electrical connectors and the second open end being configured to accept the other of the fiber optic and/or electrical connectors, the tubular body further including an internal wall extending around the axis and defining an internal cavity of the tubular body;
   a seat in the tubular body, the seat being formed with keying structure comprising a first arcuate recess extending along a circumference of the internal wall a first distance and a second arcuate recess extending along the circumference of the internal wall a second distance less than the first distance whereby the keying structure restricts the orientation of the fiber optic and/or electrical connector when received in the first open end of the tubular body.

2. The adapter of claim 1 wherein the first arcuate recess is located in a diametrically opposite position along the internal wall from the second arcuate recess.

3. The adapter of claim 2 wherein the first and second arcuate recesses each have a central portion and opposite end portions, the radial widths of the end portions being greater than the radial width of the central portion.

4. The adapter of claim 1 wherein the seat is formed to receive a clip for attachment of an adapter clip insert to the adapter.

5. The adapter of claim 1 wherein further comprising a flange formed at the second open end of the tubular body for engagement with a panel to mount the adapter and one of the fiber optic and/or electrical connectors on the panel.

6. A connection system comprising:
   the adapter of claim 1; and
   a first connector configured to mate with the first open end of the tubular body.

7. The connector system of claim 6, wherein the first connector comprises:
   a connector housing having a connection axis and including lead-ins extending from an end along the connection axis at spaced apart locations around a circumference of the connector housing, a first of the lead-ins having a first dimension along the circumference of the connector housing and a second of the lead-ins having a second dimension along the circumference of the connector housing, the first dimension being greater than the second dimension so that the housing is keyed to mate in a selected rotational orientation about the connection axis; and
   a connector clip assembly removably coupled within the housing;
   the connector clip assembly includes at least one flexible wing wherein the flexible wing is configured to engage a recess configured as part of the lead-in.

8. The connector system of claim 7, wherein the connector clip assembly is inserted into connector housing.

9. The connector system of claim 7, wherein the flexible wing is a wedge shaped.

10. The connector system of claim 7, wherein an interior surface of the housing further comprises a first cut-out and a second cut-out, the cut-outs are sized to accept a corresponding latch on an outer surface of the connector clip assembly, the cut-outs act as a key to support and to match a corresponding surface of the connector clip assembly so as to allow coupling of the connector clip assembly to the connector housing in a single orientation.

11. The connector system of claim 7, wherein the housing includes a plurality of channels wherein lead-ins mate with a corresponding adapter recess via corresponding channels without having a line of sight to or visual sight of the lead-ins connecting or mating into adapter recesses herein called blind mating.

12. The connector system of claim 7, wherein the connector clip assembly flexible wing is configured to engage a respective one of the lead-ins.

13. The connector system of claim 7, wherein the connector clip assembly further comprises a plurality of optical fiber connectors wherein one of a plurality of optical fiber connectors is a LC connector or a SC connector.

14. The connector system of claim 13, wherein the the plurality of connectors includes at least one optical fiber connector and at least one electrical connector.

15. The connector system of claim 14, wherein the at least one optical fiber connector is one of the LC connector, the SC connector and an MPO connector, and the at least one electrical connector is one of a pin contact, an electrical socket and an RJ45 connector.

16. The connector system of claim 14, wherein the connector clip assembly includes a protective sheath disposed around the at least one electrical connector.

17. The connector system of claim 16, wherein the connector clip assembly is configured so as to hold the at least one optical fiber connector and the at least one electrical connector in a stacked arrangement.

18. The connector system of claim 14, wherein the connector clip assembly further includes an in-line adapter connector clip insert comprising:
   a bottom clip portion configured to hold the at least one electrical connector; and
   a top clip portion disposed against the bottom clip portion so as to clamp the at least one optical fiber connector therebetween.

19. The connector system of claim 15, wherein the connector clip insert includes a plurality of open bracket lead-ins to accept and retain at least one optical fiber connector.

20. The connector system of claim 19, wherein the at least one optical fiber connector is an MPO connector.

21. The connector system of claim 7, further comprising a coupling nut disposed around the connector housing.

* * * * *